July 5, 1932.                H. M. SWINDLER                 1,866,431
                             STOKER AIR CONTROL
                    Filed April 28, 1930        3 Sheets-Sheet 1

INVENTOR
HARRY M. SWINDLER.
BY
    Toulmin + Toulmin
         ATTORNEYS

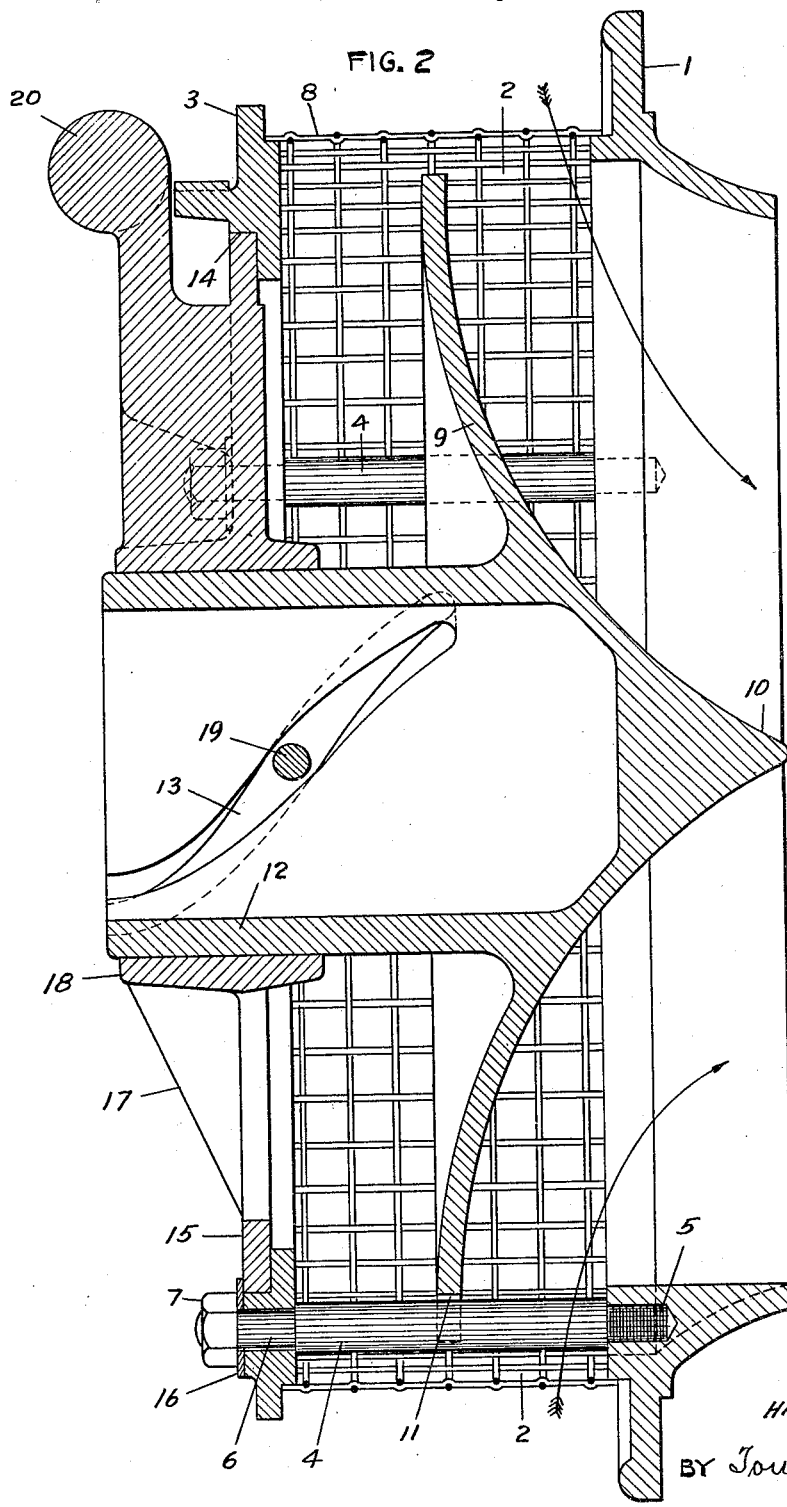

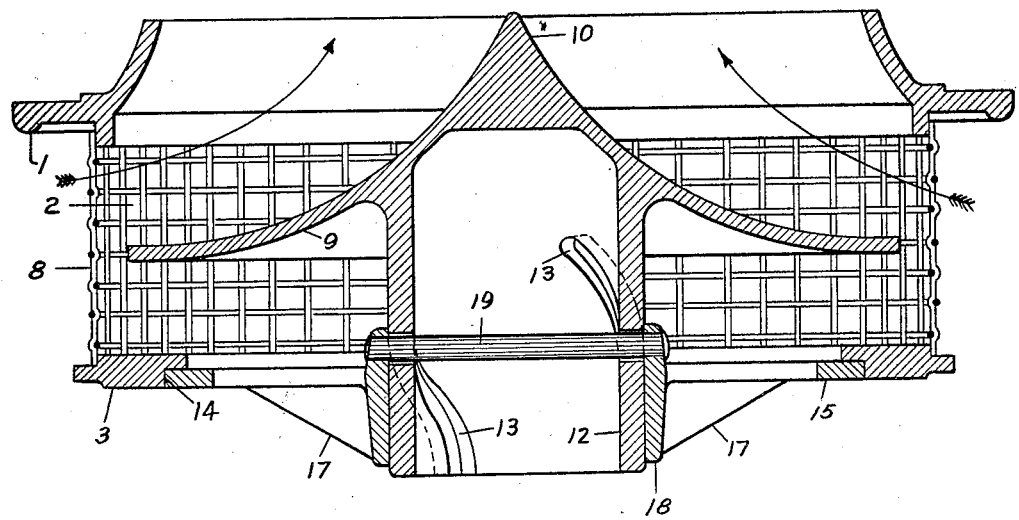
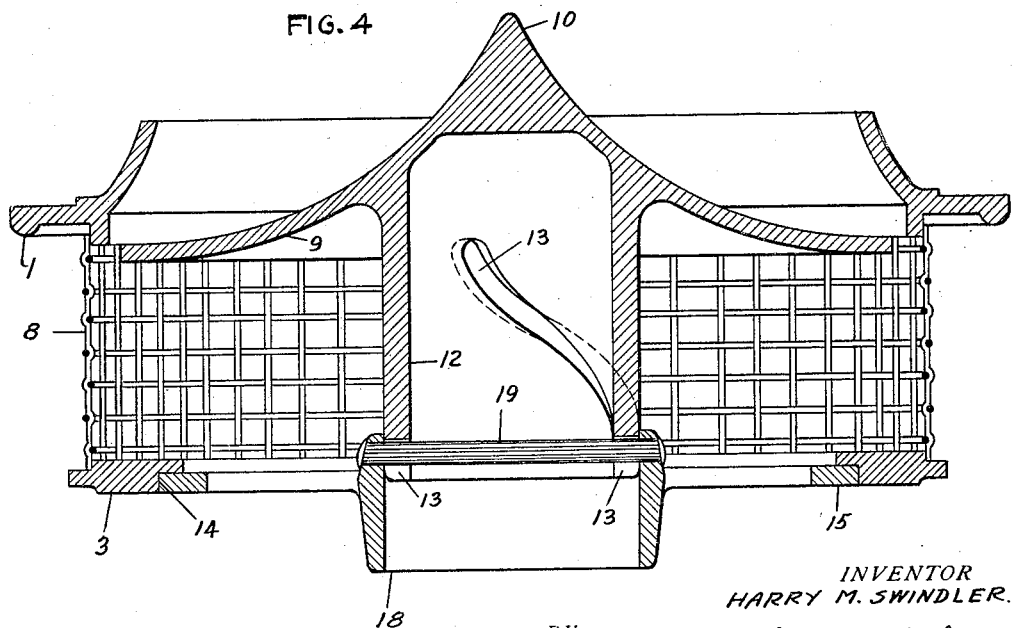

Patented July 5, 1932

1,866,431

UNITED STATES PATENT OFFICE

HARRY M. SWINDLER, OF DAYTON, OHIO, ASSIGNOR TO THE JAMES LEFFEL AND COMPANY, OF SPRINGFIELD, OHIO, A CORPORATION OF OHIO

STOKER AIR CONTROL

Application filed April 28, 1930. Serial No. 447,866.

This invention relates to improvements in air control for stokers, and has for its object the provision of means for controlling an air inlet to a furnace.

It is particularly the object of this invention to provide means for controlling or regulating the admission of air to furnaces, stokers and the like that can be operated to entirely cut off the air or to admit such amount of air as is needed.

It is also an object of this invention to provide an apparatus of this kind adapted to be located in connection with a furnace or stoker at such points as may be needed, and that can be easily and readily applied.

It is also an object of this invention to provide an apparatus of this class composed of few parts, that are easily constructed, easily assembled and when assembled operate with definiteness and certainty.

These and other advantages will appear from the description taken in connection with the accompanying drawings.

Referring to the drawings:

Figure 2 is a section on the line 2—2 of Figure 1.

Figure 3 is a section on the line 3—3 of Figure 1.

Figure 4 is a section similar to Figure 3, showing the damper closed.

Figure 1:
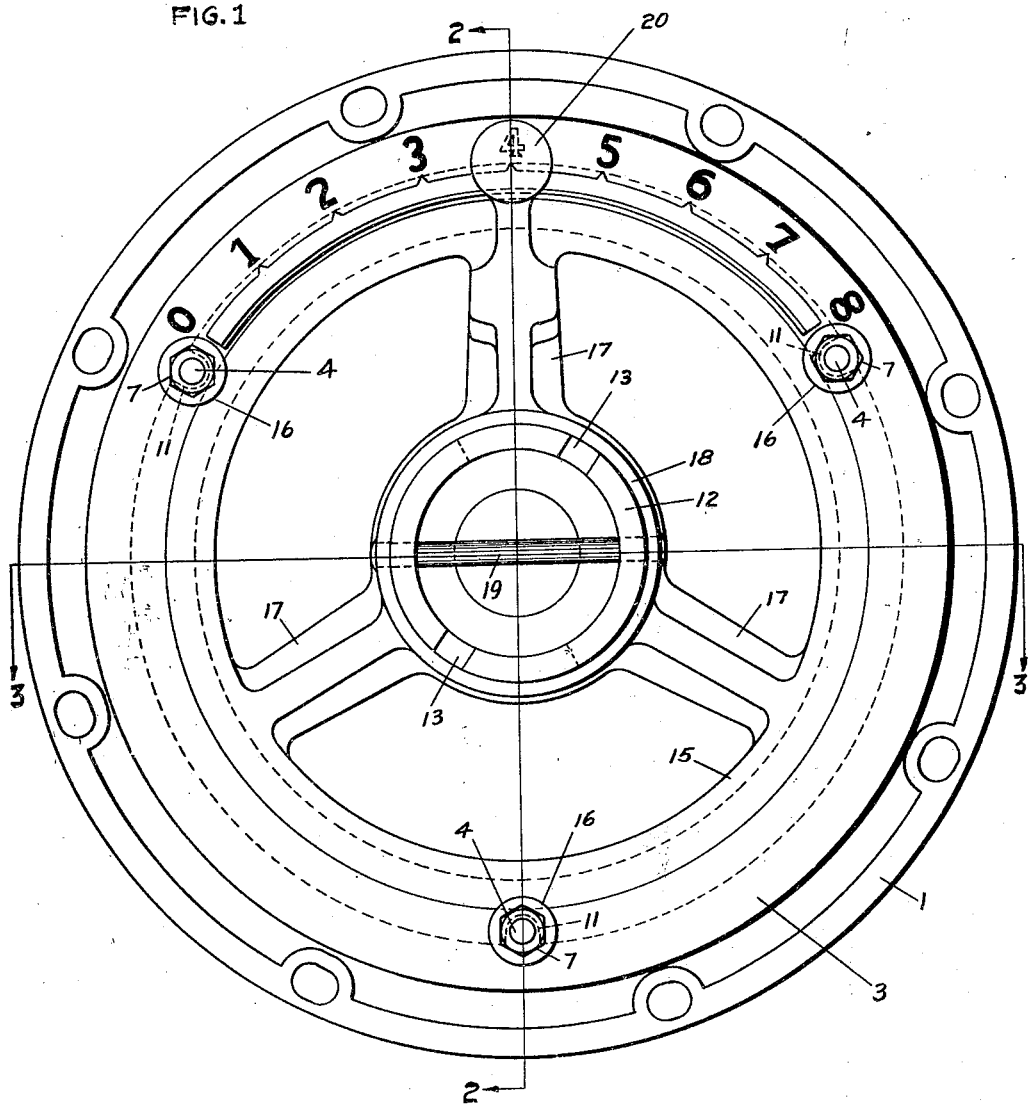
Figure 1 is a side elevation of the air control apparatus.

As shown in Figure 1, this apparatus is composed of a casing 1 adapted to be located in connection with a stoker and to be attached thereto and removed therefrom as desired. This casing is circular in shape and has an inlet 2 for the admission of air to a furnace. Cooperating with this casing 1 is a frame 3. This frame is annular shape and has on its inner periphery a seat. This frame is connected to the casing by means of a plurality of bolts 4. In the present instance there are three of these bolts. One end of each bolt is reduced at 5 and screw threaded into a suitable threaded socket in the casing 1. The other end of the bolt is reduced at 6 and receives and supports thereon the annular frame 3. For the purpose of support this frame has suitable holes in which the parts 6 fit. For the purpose of holding the frame on the bolts there are provided nuts 7, one for each bolt.

As thus constructed there is a more or less circular framework having at one end the casing 1 and at the other end the frame 3, held together by the bolts 4. Surrounding these bolts and supported at its ends by the casing 1 and the frame 3, is a wire screen 8. As shown in Figure 2, this wire screen is composed of wires woven together so that the mesh is large. The size of the wire and the mesh thereof may be regulated to suit the convenience. The purpose of this wire mesh is to prevent foreign matter, dirt and dust and things of any large size getting through the screen and into the air passageway.

It will also be observed that the inside part of the casing 1 is more or less conical in shape so as to give the air a slightly inclined direction as it leaves the casing. For the purpose of regulating the flow of air through the casing there is provided a damper 9. This damper is somewhat conical in shape, having an inwardly projecting nose 10 that projects into the central part of the opening formed by the casing 1. The wing or blade of this damper extends outwardly in a curved line, and has on its outer periphery a series of notches 11. There is one notch for each bolt 4. These bolts thus support the damper and permit it to move longitudinally in and out through the opening in the casing 1.

Extending outwardly from the nose part of the damper is a cylindrical or barrel shaped projection 12. This barrel has in opposite walls thereof a spiral slot 13. These slots extend from the outer end of the barrel in a spiral shape toward the nose of the damper. In the annular seat 14 of the frame 3 is a ring member 15 supported in the frame by means of washers 16 on the bolts 4, between the nose and the frame 3. It is obvious, therefore, that the bolts 4 serve to support and hold together all parts of this apparatus.

Extending from the ring 15 inwardly there are arms 17 which terminate in a hub 18. This hub fits over the outer end of the barrel or cylinder 12 and has extending therethrough a pin 19. This pin is located in the inner end of the hub and passes through the slots 13 in the barrel or cylinder 12. One of the arms 17 is enlarged and has a projection thereon to form a handle 20 for rotating the ring 15 in its seat 14.

As shown in Figure 1 the upper periphery of the frame has thereon a series of numbers from zero to 8. These numbers are used to designate and indicate the position of the damper. When the handle 20 is in the position indicated by zero the damper is closed, and as the handle moves from the zero point clockwise toward the number 8 the damper is opened. As shown in Figures 1 and 2, the handle is at the point 4, indicating that the damper is half closed. The damper is operated by moving or oscillating the handle thus clockwise or anti-clockwise. In moving the handle in this manner the pin 19 is caused to rotate, and since this pin is in the slot 13 in the barrel 12 the rotation of the pin causes the barrel to move in and out through the hub, and since it is attached thereto the damper member likewise moves as the hub moves.

In order to shift the damper from closed to fully open position the handle 20 moves through about one-third of the complete circle. It is therefore obvious that the spiral slots 13 extend around the barrel 12 about one-third of the complete circumference of the barrel. In the complete opening and closing of the damper the pin 19 will move from one end to the other of the spiral slots 13. It is also obvious in the rotation of the handle 20 that the damper must move in and out with relation to the casing 1 because the damper cannot turn or rotate owing to its being held by the notches 11 fitting over the bolts 4.

I desire to comprehend within my invention such modifications as may be clearly embraced within my claims and the scope of my invention.

Having thus fully described my invention, what I claim as new and desire to secure by Letters Patent, is:

1. In an air control apparatus, a casing having an air inlet, a ring, bolts supporting the ring spaced from the casing, a screen between the ring and the casing and surrounding the inlet, and means supported by said bolts and movable into and out of said inlet to regulate the flow of air therethrough.

2. In an air control apparatus, a casing having an air inlet, a ring, bolts supporting the ring spaced from the casing, a screen around the bolts and a cone-shaped damper means supported by said bolts and movable into and out of said inlet to regulate the flow of air therethrough.

3. In an air control apparatus, a casing having an air inlet and a screen around the inlet, supports extending from said casing, means on said supports within the screen and movable into and out of said inlet to regulate the flow of air therethrough, and means supported by said supports to move said means.

4. In an air control apparatus, a casing having an air inlet and a screen around the inlet, a plurality of horizontal support members extending from said casing, a damper means supported by said support members within the screen and movable into and out of said inlet to regulate the flow of air therethrough, and means adapted to oscillate about part of the damper means to move said damper means.

5. In an air control apparatus, a casing having an air inlet and a screen around the inlet, a plurality of support members arranged around said inlet and extending horizontally from the casing, means supported by said support members within the screen and movable to and from said inlet to regulate the flow of air therethrough, and means adapted to oscillate around part of said means to move it.

6. In an air control apparatus, a casing having an air inlet and a screen around the inlet, a plurality of support bolts extending horizontally from said casing within the screen, damper means supported by said bolts and movable to and from said inlet to regulate the flow of air therethrough, and means surrounding part of said damper means to move it.

7. In an air control apparatus, a casing having an air inlet, a frame supported by said casing around said inlet, a damper means supported by said frame and movable to and from said inlet to regulate the flow of air therethrough, and means supported by said frame for moving said damper means.

8. In an air control apparatus, a casing having an air inlet, a frame supported by said casing around said inlet, a damper means supported by said frame and movable horizontally to and from said inlet to regulate the flow of air therethrough, and a ring member supported by said frame and operatively connected to said damper means to move it.

9. In an air control apparatus, a casing having an air inlet, a frame supported by said casing around said inlet, damper means supported by said frame and movable horizontally to and from said inlet to regulate the flow of air therethrough, a spirally slotted barrel member extending from the damper means, and a rotatable ring member having a pin fittting in said slot for moving said damper means.

10. In an air control apparatus, a casing having an air inlet, a frame supported by said casing, damper means supported by said frame and movable into and out of said inlet to regulate the flow of air therethrough, a spirally slotted barrel member extending from the damper means, and a rotatable ring member having a pin fitting in said slot for moving said damper means, said ring member being supported by the frame for rotation around the barrel member.

11. In an air control apparatus, a casing having an air inlet, an annular frame member supported on said casing and held in spaced relation thereto by a plurality of bolts arranged around said inlet, a sieve member extending around said bolts, a damper means supported by said bolts for movement to and from said inlet, and means for moving said damper means.

12. In an air control apparatus, a casing having an air inlet, an annular frame member supported on said casing and held in spaced relation thereto by a plurality of bolts arranged around said inlet, a sieve member extending around said bolts, damper means supported by said bolts for movement to and from said inlet, a spirally slotted barrel member extending from said damper means, a ring member rotatably supported by said frame, and a hub member carried by said ring member having a pin fitting in said slot, whereby rotation of the ring will cause the damper means to move to and from the inlet.

13. In an air control apparatus, a casing having an air inlet, an annular frame member supported on said casing and held in spaced relation thereto by a plurality of bolts arranged around said inlet, a sieve member extending around said bolts, damper means having marginal notches to receive the bolts supported and guided by said bolts for movement to and from the inlet, a barrel member having oppositely disposed spiral slots extending from said damper means, a ring member rotatably supported by said frame, a hub member carried by said ring member, said hub member fitting over said barrel member, and a pin extending through said hub member and fitting in said spiral slots so that a rotation of the ring will cause the damper to move.

14. In an air control apparatus, a casing having an air inlet, an annular frame member supported on said casing and held in spaced relation thereto by a plurality of bolts arranged around said inlet, a sieve member extending around said bolts, damper means having marginal notches to receive the bolts supported and guided by said bolts for movement to and from the inlet, a barrel member having oppositely disposed spiral slots extending from said damper means, a ring member rotatably supported by said frame, a hub member carried by said ring member, said hub member fitting over said barrel member, a pin extending through said hub member and fitting in said spiral slots so that a rotation of the ring will cause the damper to move, and handle means on said ring member for rotating the ring member and the hub and pin.

In testimony whereof, I affix my signature.

HARRY M. SWINDLER.